United States Patent [19]

Woodmansee et al.

[11] Patent Number: 5,411,712
[45] Date of Patent: May 2, 1995

[54] BATCH SYSTEM FOR MICROWAVE DESORPTION OF ADSORBENTS

[75] Inventors: Donald E. Woodmansee, Schenectady, N.Y.; Philip J. Caliendo, Trumbull, Conn.; Andrew P. Shapiro, Schenectady, N.Y.

[73] Assignee: General Electric Company, Schenectady, N.Y.

[21] Appl. No.: 21,937

[22] Filed: Feb. 24, 1993

[51] Int. Cl.[6] .................. B01J 19/08; H05B 6/64; H05B 6/80
[52] U.S. Cl. .................. 422/186; 422/307; 219/679; 219/756; 219/762; 219/763
[58] Field of Search ........... 422/186, 307; 219/679, 219/756, 762, 763

[56] References Cited

U.S. PATENT DOCUMENTS

| | | | |
|---|---|---|---|
| 3,440,385 | 4/1969 | Smith | 219/10.55 |
| 3,549,848 | 12/1970 | Williams | 219/10.55 |
| 3,582,598 | 6/1971 | Wincott | 219/10.69 |
| 3,771,234 | 11/1973 | Forster et al. | 34/1 |
| 3,772,491 | 11/1973 | Gerling | 219/10.55 |
| 4,039,795 | 8/1977 | Laszlo et al. | 219/10.55 A |
| 4,163,141 | 7/1979 | Tanaka et al. | 219/10.55 F |
| 4,280,033 | 7/1981 | Wagener et al. | 219/10.55 A |
| 4,322,394 | 3/1982 | Mezey et al. | 423/244 |
| 4,364,859 | 12/1982 | Ohtsuka et al. | 252/643 |
| 4,370,534 | 1/1983 | Brandon | 219/10.55 A |
| 4,444,723 | 4/1984 | Matsumaru et al. | 422/159 |
| 4,737,610 | 4/1988 | Kotsch et al. | 219/10.55 M |
| 4,746,968 | 5/1988 | Wear et al. | 219/10.55 F |
| 5,345,068 | 9/1994 | Hatano et al. | 219/722 |

*Primary Examiner*—Donald P. Walsh
*Assistant Examiner*—Daniel Jenkins
*Attorney, Agent, or Firm*—Patrick R. Scanlon; Paul R. Webb, II

[57] ABSTRACT

Microwave heating is used to desorb successive batches of contaminated adsorbent. The apparatus includes first and second stations and an adsorbent carrier tray displaceable between the two stations. Adsorbent is loaded and unloaded from the tray in the first station and heated with microwave energy in the second station. The tray is loaded by passage under a feed hopper, thereby providing an even bed of adsorbent in the tray. Unloading is performed by rotating the tray to an inverted position so that the adsorbent falls into a bin below. The second station includes an oven chamber which is swept with a purge gas to remove gaseous sorbates desorbed from the adsorbent. The tray can include a gas-permeable adsorbent support structure to facilitate passing purge gas and gasification reactants through the adsorbent bed.

46 Claims, 9 Drawing Sheets

BATCH SYSTEM FOR MICROWAVE DESORPTION OF ADSORBENTS

CROSS REFERENCES TO RELATED APPLICATIONS

This application is related to copending application entitled "Ventilated Tray for Adsorbent Desorption," Ser. No. 08/021,938, filed concurrently herewith and assigned to the same assignee as the present invention.

BACKGROUND OF THE INVENTION

This invention relates generally to the desorption of contaminated adsorbent materials using microwave energy and more particularly concerns an improved batch system for effective microwave desorption.

In industry, process streams carrying contaminants or other components are often purified by passing the stream in contact with an adsorbent. The contaminants or other components are adsorbed by the adsorbent, thereby removing them from the process stream. Materials commonly used as adsorbents include activated carbon, activated charcoal, zinc oxide, activated alumina and molecular sieves. Adsorption is most effective when the adsorbent is maintained at ambient temperatures or cooler. The adsorbed materials are referred to as adsorbates or simply sorbates. Thus, a sorbated adsorbent refers to an adsorbent having adsorbed materials therein. In the course of cleansing process streams, the adsorbent will eventually become saturated with sorbates and be unable to adsorb further materials. Rather than simply being disposed of, a saturated adsorbent can be recycled through a process which desorbs or strips the sorbates from the adsorbent. Once the sorbates have been desorbed, the adsorbent is again capable of being used to cleanse process streams.

Many organic contaminants can be desorbed by heating the adsorbent to relatively low temperatures (e.g., in the range of 100°–300 ° C. for activated carbon). This low temperature process is referred to as regeneration. However, some contaminants cannot be desorbed at regeneration temperatures. These remnant contaminants, which might be high boiling point materials or result from polymerization on the adsorbent, are referred to as the "heel." After many (hundreds or even thousands) regenerations, the heel buildup diminishes the sorbent capacity of the adsorbent to the extent that the adsorbent is no longer useful. At this point, the adsorbent must not only be treated at higher temperatures (e.g., about 900°–1000 ° C. for activated carbon) but must also be exposed to reactants (such as steam or carbon dioxide) which can gasify some of the heel and the adsorbent to create new surface area. This process is called reactivation and is usually performed in large, off site furnaces. As used herein, the terms "desorption" or "desorbing process" refer to both regeneration and reactivation.

It is desirable to employ a desorbing process which is capable of stripping the sorbates on the plant site, because such a process eliminates the need to ship the sorbated adsorbent off site for cleaning. Besides offering cost advantages, on-site desorption reduces the number of plant emissions which must be reported to the Environmental Protection Agency, making additional uses in the plant more economically attractive.

A typical on-site method of regenerating a saturated adsorbent is to heat the adsorbent with a flow of hot gas such as steam, nitrogen or flue gases to a sufficiently high temperature at which the sorbate will be desorbed. The high temperature causes the sorbated matter to vaporize and pass from the adsorbent. The flow of the hot gas also purges the vaporized or desorbed materials from the system. The adsorbent bed must be taken off-line to be swept with the hot gas. Some disadvantages of this gas heating method include long regeneration times, large amounts of purge gas, non-uniform heating of the adsorbent material, and dilution of the sorbate vapors with heating gases. This dilution is a problem when the desorbed materials must subsequently be removed from the purge gases. Furthermore, the gas heating method requires heating not only the adsorbent material but also the entire structure containing the adsorbent, which is necessarily several times heavier than the adsorbent. Thus, the design of the containment structure is controlled by the temperature and corrosion limits prescribed by the regeneration process. In addition, this type of gas heating usually can achieve temperatures only in the range of about 100°–150 ° C. and is thus insufficient for reactivation.

Microwave heating of the adsorbents has been proposed to avoid some of the problems associated with the hot gas heating method. Microwave heating has an advantage in that the adsorbent material can be heated without directly heating the containment structure. Thus, the energy required for microwave heating is less than heating with hot gas. The cost of the containment structure can also be reduced since the structure itself is subjected to lower temperature ranges. Microwave heating also can produce generally higher temperatures than the gas heating method. Therefore, microwave heating is readily applicable to reactivation, as well as regeneration.

One microwave desorption approach is set forth in U.S. Pat. No. 4,737,610 to Kotsch et al. The Kotsch et al patent discloses a method and apparatus using a gravity-driven moving bed for the desorption of noxious materials from a carbonaceous adsorption agent. Saturated carbon or coke is fed into the regeneration unit via a dosing and closure unit 1. The coke falls into a quartz conduit 2 where it is heated by a microwave heating means. The coke then enters a desorption gas collector 6 where it builds up a free fill above a perforated conical plate 7. In the desorption gas collector 6, the coke is swept with an inert gas to apparently remove the desorbed noxious materials. In a second embodiment, the quartz conduit is replaced with a horizontal moving belt which conveys coke through a heating chamber prior to dumping the coke into the desorption gas collector 6 by gravity feed. While the Kotsch et al patent solves many of the problems associated with hot gas heating, other drawbacks arise. For instance, there is a high degree of relative movement between individual coke granules as well as between the coke granules and the walls of the container due to the continuous, free fall method of moving the coke. This relative movement tends to grind some of the coke into smaller, less useful particles, thus producing attrition losses. The coke is especially susceptible to attrition when the relative movement occurs while the coke is exposed to the higher temperatures of regeneration. The free falling coke is also susceptible to agglomeration of granules when containing water, dirt and/or other solids.

A microwave desorption approach which addresses the attrition problem is set forth in U.S. Pat. No. 4,322,394 to Mezey et al. The Mezey et al patent discloses a process for thermal regeneration of adsorbents wherein the adsorbent is heated dielectrically to desorb the sorbates, after which a small quantity of purge gas may be applied to flush the sorbates. The microwave heating is applied while the adsorbent is within the adsorber reactor chamber. This avoids the attrition of the adsorbent that arises from transporting the adsorbent to another apparatus for regeneration. However, desorbing the adsorbent within the adsorber reactor chamber requires that the adsorber be taken off-line for the entire process. This down time includes not only time for heating and desorbing the adsorbent but also time for cooling the system back to operating temperature. The cool down time can be quite long due to the large mass of the adsorbent and the typically massive adsorber vessel which has been be heated by conduction from the adsorbent. Consequently, the adsorber reactor chamber would be unavailable for its primary function for a significant time. Furthermore, the Mezey et al device would require significant modifications to the adsorber reactor chamber to accommodate the internal microwave heating and to provide additional valving for the separate purge gas flow.

Thus, it would be advantageous to have a desorption system which does not require a lengthy shut down of the adsorber and handles the adsorbent with minimal attrition. A non-continuous or batch system is such an approach which is particularly attractive for low throughput requirements. This approach comprises transferring the adsorbent from the adsorber vessel to a separate container and exposing the container to microwave energy in order to heat the adsorbent to the necessary temperature. The adsorber can be provided with clean adsorbent during this process and thus be kept on-line. And while a certain amount of handling of the adsorbent is required, it is minimal with no relative movement during heating. However, known batch systems have long cycle times because of slow, inefficient means for handling the adsorbent. Furthermore, the heated adsorbent is typically left in the container to cool while another, cold container is used for the next batch. Although only the adsorbent is directly heated by the microwaves, the container is heated by conduction from the adsorbent. And since the container usually holds more heat than the adsorbent, allowing the container to cool each time represents substantial lost heat and wasted energy.

Accordingly, there is a need for an on-site batch system for microwave desorption of adsorbents which has an efficient means for handling the adsorbent and retains heat in the adsorbent container between batches.

SUMMARY OF THE INVENTION

The above-mentioned need is met by the present invention which provides an apparatus for desorbing a sorbated adsorbent comprising a housing including a first enclosure and a second enclosure and a passage connecting the two enclosures. An adsorbent carrier tray is provided for movement between the two enclosures via the passage. The tray is displaced by a drive mechanism which comprises a flexible line element attached to opposing ends of the tray and a motor for driving the flexible line element. The flexible line element can be attached to the tray by means of microwave transparent connector rods.

An adsorbent heating chamber having a door for admitting the adsorbent carrier tray and a vent for removing desorbed materials is disposed in the second enclosure. The heating chamber includes a plurality of rollers to facilitate positioning the tray therein. Microwaves are generated in the second enclosure by a microwave power source. The heating chamber may include a tray lid hinged to an inner wall thereof, the tray lid being arranged to rest on the tray when the tray is positioned in the heating chamber and the door is closed. The door has a lip extending therefrom to engage and lift the tray lid as the door is opened. The apparatus further comprises an inlet for introducing a purge gas into the heating chamber and another inlet for optionally introducing a reactivation reactant into the heating chamber.

A tray supporting structure is disposed in the first enclosure for supporting the tray therein. A first receptacle is located above the tray supporting structure and a second receptacle is located below the tray supporting structure. In a preferred embodiment, the tray supporting structure comprises a rotatable platform having a motor for causing rotation. This embodiment includes tray holding brackets attached to the platform. The tray is thus emptied by rotation of the platform. In another embodiment, the tray supporting structure comprises a pair of spaced-apart rails. The tray can be emptied by a retractable plow member positioned above the rails so as to be displaceable into the tray. As the tray and the plow member are relatively displaced, the plow member forces adsorbent out of the tray. Or the tray can be emptied by a retractable detent member positioned above the rails so as to be displaceable in and out of engagement with an outer edge of the tray. In this case, the tray comprises an annulus section and a panel section slideably fitted therein so that when the detent arm engages the tray the annulus section is held in place while the panel section is removed, causing the adsorbent to fall out.

The adsorbent carrier tray can be of any form capable of holding the adsorbent. In a preferred embodiment, the adsorbent carrier tray comprises a housing having four walls and a bottom piece and a gas-permeable adsorbent support structure disposed in the housing above the bottom piece. An exhaust gas outlet is formed in one of the four walls at a point below the adsorbent support structure. In addition to the exhaust gas outlet, the tray could also include a cleanout access aperture located in one of the four walls.

The adsorbent support structure preferably comprises a porous plate. Alternatively, the adsorbent support structure comprises a plate having a plurality of holes formed therein and a plurality of circular members having larger diameters than the holes, wherein each of the plurality of circular members is centered above one of the holes. In another alternative, the adsorbent support structure comprises a first plate having a plurality of holes formed therein and a second plate having a plurality of holes formed therein positioned above the first. The holes in the respective plates are arranged so as not to be in direct vertical alignment. In a third alternative, the adsorbent support structure comprises a first plurality of spaced, coplanar bars defining gaps therebetween and a second plurality of spaced, coplanar bars disposed below the first bars so that each of the lower bars is located below one of the gaps defined by the upper bars.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, maybe best understood by reference to the following description taken in conjunction with the accompanying drawing figures in which:

DETAILED DESCRIPTION OF THE INVENTION

Figure 1:
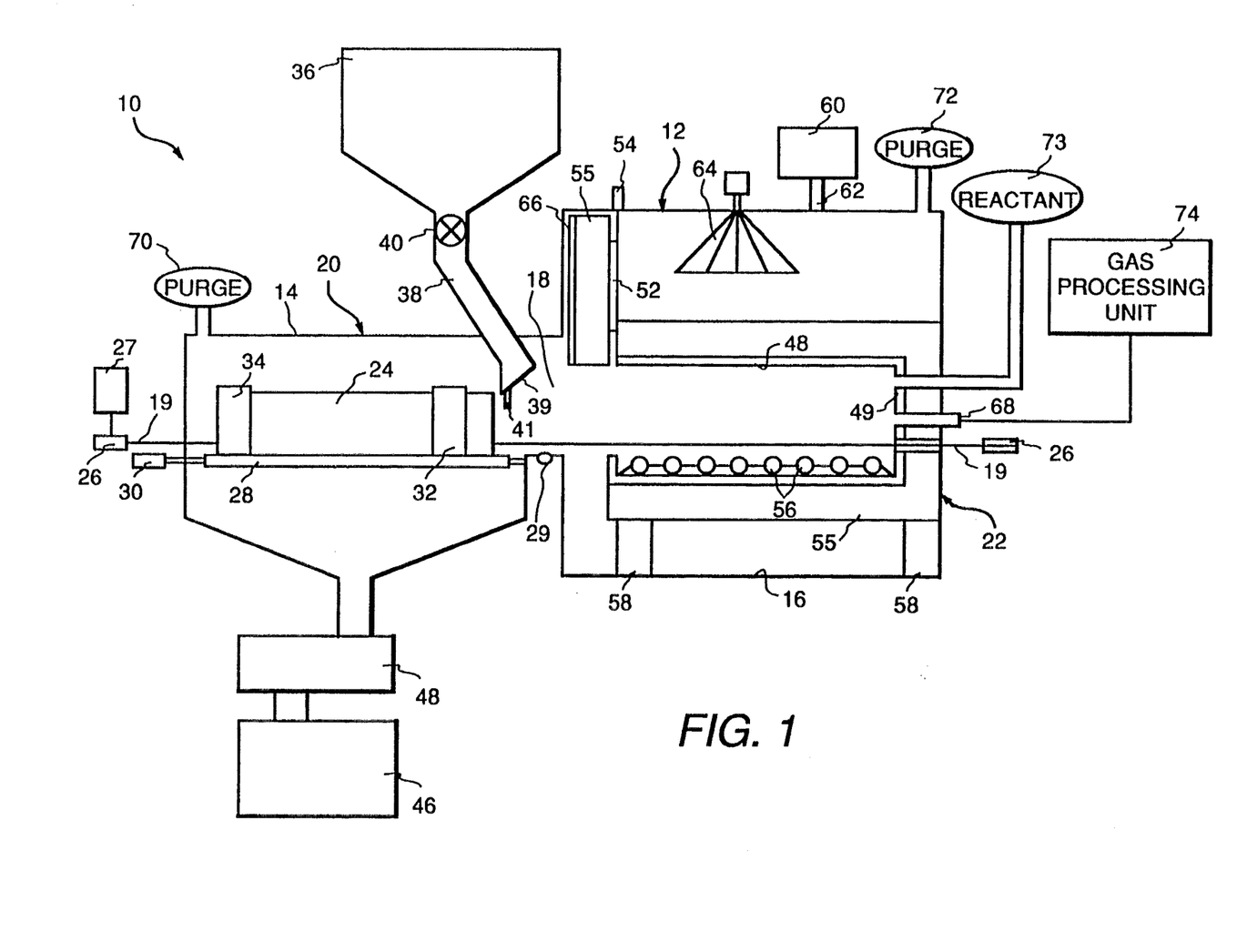
FIG. 1 shows an elevation view of the microwave regeneration batch system of the present invention.

Referring to the drawings wherein identical reference numerals denote the same elements throughout the various views, FIG. 1 shows an adsorbent desorbing apparatus 10 of the present invention. The adsorbent desorbing apparatus 10 comprises an outer housing 12 which has a first enclosure 14 and a second enclosure 16 and a passage 18 formed between the two enclosures. The adsorbent desorbing apparatus 10 is comprised of two primary sections: a solids handling station 20, which includes the first enclosure 14, and a desorbing or microwave applicator station 22 station, which includes the second enclosure 16. An adsorbent carrier tray 24 is provided which is displaceable back-and-forth between the solids handling station 20 and the desorbing station 22 via the passage 18. The function of the solids handling station 20 is to load and unload adsorbent to and from the tray 24, while the function of the desorbing or microwave applicator station 22 is to desorb the adsorbent by application of microwave heating.

The tray 24 is displaced by a drive system comprising a flexible line element 19 having its ends connected to opposite ends of the tray 24 in a closed loop around a plurality of pulleys 26. As used herein, the term "flexible line element" refers to any element capable of transmitting displacement. This includes but is not necessarily limited to a chain, cable, belt, cord, rope or the like. A drive motor 27 is connected to one of the pulleys 26 to drive the flexible line element 19 and thus displace the tray 24. Although such a flexible line element drive system is preferred, other known systems such as a retractable telescoping rod or a screw-and-nut system could also be used. In any event, one or more rollers 29 can be disposed on the lower surface of the passage 18 to facilitate movement of the tray 24 therethrough.

The solids handling station 20 includes a rotary tray supporting platform 28 disposed in the first enclosure 14. The rotary tray supporting platform 28 is positioned adjacent to passage 18 so as to support the tray 24 in the solids handling station 20. The rotary tray supporting platform 28 is rotatively mounted to the inside of the first enclosure 14 so as to be rotatable about an axis which is parallel to the direction of tray displacement. A rotary motor 30 is provided to produce rotation of the rotary tray supporting platform 28. A pair of tray holding brackets 32,34 are attached to respective sides the tray supporting platform 28 for maintaining the tray 24 in position with respect to the tray supporting platform 28 during rotation of the platform 28. The first tray holding bracket 32, located closest to the passage 18, is an inverted. U-shaped bracket which the tray 24 can slide under. The second tray holding bracket 34 is also an inverted U-shaped bracket but has an inwardly-extending detent flange along the side furthermost from the passage 18. The detent flange prevents the tray 24 from sliding completely through the bracket 34 and thereby defines a work position of the tray 24 relative to the tray supporting platform 28.

An input hopper 36 which holds saturated or sorbated adsorbent is disposed above the tray supporting platform 28. A feed chute 38 extends from the input hopper 36 into the first enclosure 14. A valve 40 is provided at the bottom of the input hopper 36 to control the flow of adsorbent into the feed chute 38. The outlet of the feed chute 38 is positioned above and slightly beyond the edge of the tray 24 which is closest to the passage 18 when the tray 24 is in the work position. A chute door 39 closes the outlet of the feed chute 38. The chute door 39 is biased (typically by a spring) to be normally closed. A control arm 41 is attached to the chute door 39 so as to be aligned in a transverse direction with a side of the tray 24. The control arm 41 is connected to pivot clockwise with respect to the chute door 39 but not counterclockwise. Thus, as the tray 24 is moved towards the passage 18, the tray 24 engages the control arm 41, and since the control arm 41 will not pivot counterclockwise with respect to the chute door 39, both the control arm 41 and the chute door 39 are forced in the direction of tray motion, thereby opening the chute 38. Adsorbent can then fall into the tray 24. The movement of the tray 24 during adsorbent loading causes the adsorbent to be loaded in tray 24 in the form of an even layer, thereby ensuring uniform heating of the adsorbent in the microwave applicator station 22. A leveling dam (not shown) can be suspended from the chute 38 above the tray 24 to facilitate loading the adsorbent in an even layer.

When the tray 24 completely passes under the chute 38, it disengages the control arm 41. The bias of the chute door then causes it to close the feed chute 38. When the tray 24 is displaced in the opposite direction for return to the solids handling station 20, the control arm 41 simply pivots clockwise with respect to the chute door 39 to permit the tray 24 to pass through. An output hopper 42 is positioned below the tray supporting platform 28 to collect adsorbent emptied from the tray 24 by rotation of the tray supporting platform 28. The output hopper 42 funnels the collected adsorbent through an adsorbent cooler 44 which cools the adsorbent for holding in a storage bin 46. The adsorbent in the storage bin 46 is ready to be reused.

The desorbing or microwave applicator station 22 includes an oven chamber 48 made of a microwave transparent material such as ceramic disposed in the second enclosure 16. The oven chamber 48 has an opening 50 facing the passage 18 for admitting the tray 24 therein. A vertically sliding door 52 is provided to close the opening 50. Preferably, the door 52 forms a nearly gas-tight seal about the opening 50. Thus, the door 52 closes the oven chamber 48 but permits a slow gas leak due to the imperfect seal. An actuator 54 is provided for opening and closing the door 52. The entire outer surface of the oven chamber 48, including the outer surface of the oven door 52, is covered with thermal insulation 55 to keep heat in the chamber 48. A series of ceramic rollers 56 are disposed on the lower, inner surface of the oven chamber-48 to facilitate the movement of the tray 24 in and out of the chamber 48. The oven chamber 48 is supported in a raised position within the second enclosure 16 by support legs 58. Thus, adsorbent in the tray 24 is exposed to microwaves from all sides, making for faster heating.

The microwave heating can be produced by any one of the many standard arrangements known in the art. The preferred embodiment is a microwave power source 60 (such as one or more magnetrons) mounted externally of the second enclosure 16. The microwave power source 60 will usually operate at one of the frequencies assigned by the Federal Communications Commission for such uses. The most typical frequencies are 0.915 GHz and 2.45 GHz. The power required by the microwave power source 60 will depend on the particular application. The power level should be sufficient to heat the adsorbent in a reasonable time period. The microwaves are directed to the interior of the second enclosure 16 via a waveguide 62. As is well known in the art, a microwave stirrer 64 is also provided. The microwave power source 60 must be sealed from the vapor in the second enclosure 16. This is accomplished by placing a gas seal (not shown) in the waveguide 62. The seal would be made from a plastic material which passes microwave radiation but is impervious to the vapors. Examples of such materials are Teflon resins and polypropylene. The second enclosure 16 is made of an electrically conductive material such as metal to retain the microwaves therein. Furthermore, the outer surface of insulation 55 on the oven chamber door 52 is provided with a layer of metal 66 which aligns with the passage 18 to prevent microwave leakage through the passage 18. Alternatively, the microwave heating could be produced by a microwave antenna coupled to a microwave emitter.

As the adsorbent in the tray 24 is heated by the microwave heating, the sorbates are evolved from the adsorbent in vapor form. An exhaust vent 68 connecting the interior of the chamber 48 with the exterior of the second enclosure 16 is provided for removing the desorbed vapors therefrom. An inert purge gas such as nitrogen is introduced into the housing 12 via an inlet 70 located in the solids handling station 20, an inlet 72 located in the desorbing station 22, or both. A reactant inlet 73 is included for introducing reactivation reactants, such as steam or carbon dioxide, into the chamber 48 when needed. The vent 68 is connected to a gas processing unit 74 shown schematically in FIG. 1. The gas processing unit 74, which includes one or more fans (not shown) for removing the desorbed materials through the vent 68, provides for the selective recovery or destruction of the desorbed materials. For recovery, the removed vapors would be cooled in a condenser system and collected for future use. Destruction could be accomplished by burning the vapors with added air in a vapor incinerator. Means for both the recovery or destruction of evolved vapors are known in the field and need not be further described here.

The system gas flows (i.e., exhaust gas through the vent 68 and purge gas through the inlets 70,72) are closely controlled to ensure proper handling of the desorbed gases. Specifically, by controlling the inflow rate of purge gas through inlets 70,72 to exceed the rate at which purge gas seeps through the imperfect gas seal created by the chamber door 52, the pressure in the second enclosure 16 is maintained slightly above atmospheric pressure. This prevents ambient air from entering the second enclosure 16. The pressure in the oven chamber 48 is held slightly below the pressure in the second enclosure 16 by causing the rate at which gas is removed through the vent 68 to exceed the rate purge gas seeps through the imperfect gas seal of the chamber door 52. Thus, desorbed gases cannot leak from the chamber 48 into the second enclosure 16. This arrangement thus assures that the vapors emanating from the adsorbent are removed only through the vent 68 and do not leak into the local atmosphere. In addition, air is prevented from contacting the adsorbent or the desorbed material inside the apparatus housing 12.

Figure 2:
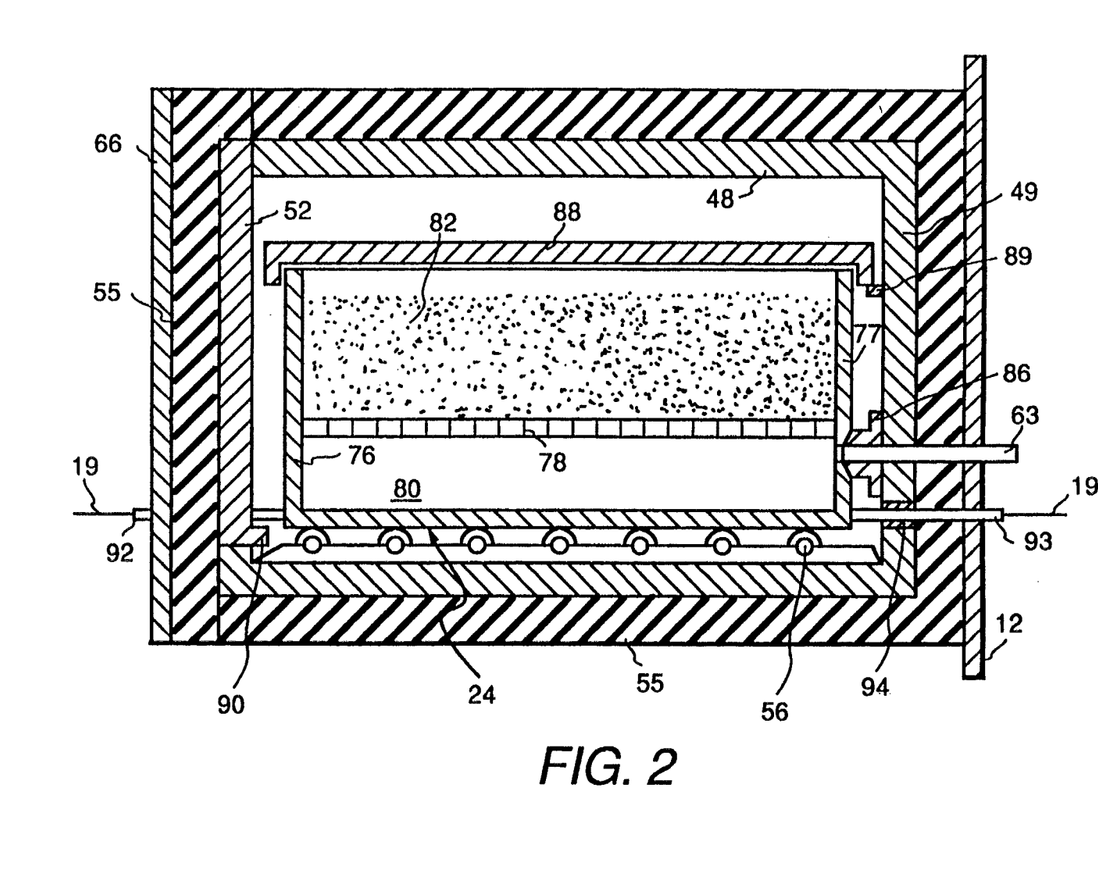
FIG. 2 shows a cross-section view of an oven chamber with a ventilated tray of the present invention disposed therein.
Figure 3:
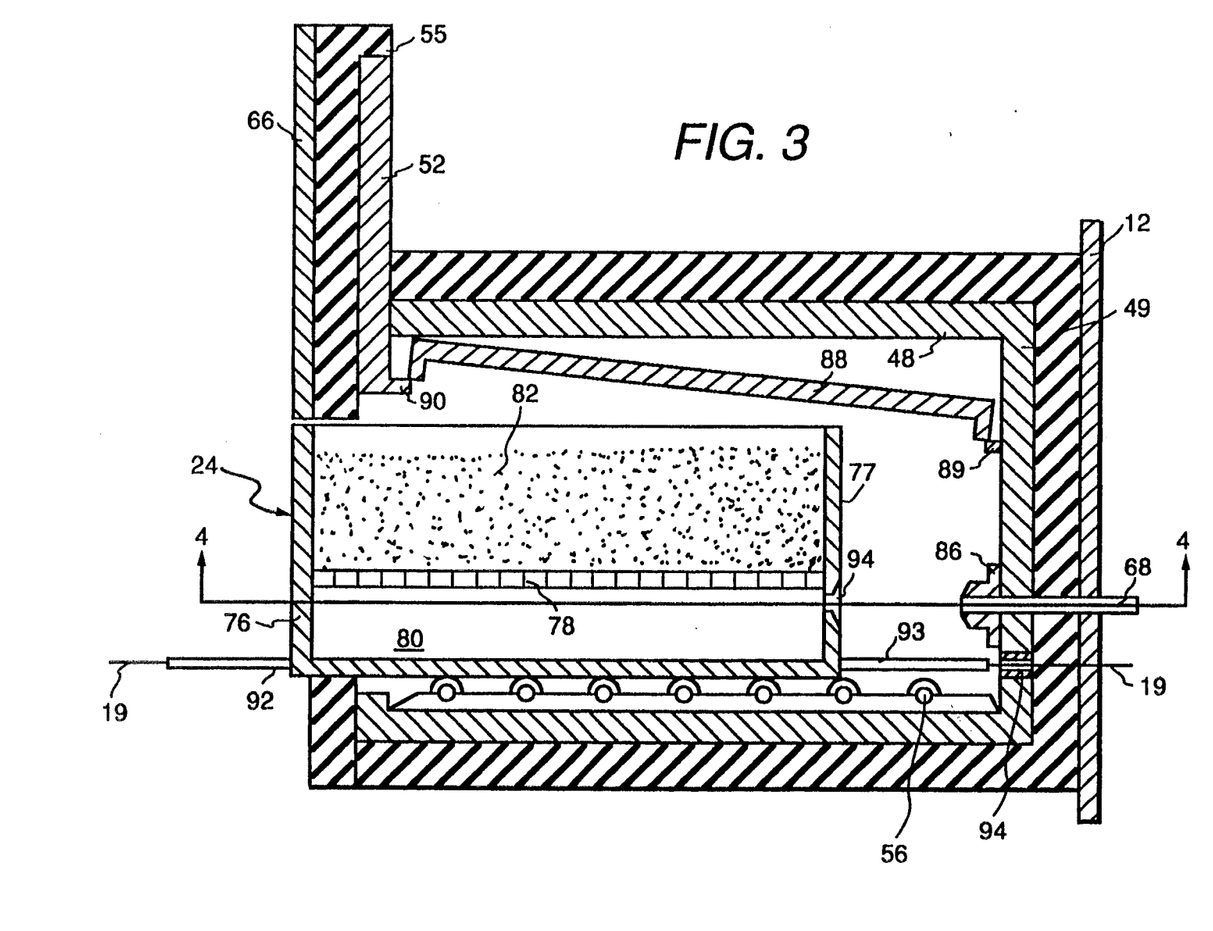
FIG. 3 shows a cross-section view of the oven chamber with the ventilated tray of the present invention partially removed therefrom.

As described above, the tray 24 can be embodied as any member capable of carrying the adsorbent material and withstanding the conditions of the microwave heating. FIGS. 2 and 3 show a preferred embodiment of the tray 24 which has a ventilated configuration for better gas handling. A similar ventilated tray is described in the above-mentioned application Ser. No. 08/021,938. FIG. 2 shows the ventilated tray 24 fully positioned in the oven chamber 48 with the chamber door 52 closed; FIG. 3 shows the door 52 opened and the tray 24 partially removed from the oven chamber 48. The tray 24 comprises a tray housing 76 in the form of a box having a bottom and four side walls. An adsorbent support plate 78 is situated above the bottom of the housing 76 to define an exhaust gas plenum 80 in the lower portion of the housing 76. The adsorbent 82 is carried on the top of the support plate 78. The support plate 78 is a porous plate having pores which are smaller than the grain size of the adsorbent 82 so as to permit gas flow therethrough while not allowing the adsorbent to fall through. The housing 76 has a gas outlet 84 for removing gases from the plenum 80. Preferably, the gas outlet 84 is formed in a back wall 77 of the housing 76. The outlet 84 is positioned to engage a bayonet joint 86 connected to the vent 68 in the back wall 49 of the oven chamber 48 when the tray 24 is fully positioned in the chamber 48, thereby providing fluid communication between the plenum 80 and the vent 68 for removal of desorbed vapors.

A tray lid 88 is disposed in the oven chamber 48 to rest on the top of the tray 24 when the tray 24 is fully in the chamber 48. The tray lid 88 is capable of being pivoted upwardly about its rear edge. As seen in FIGS. 2 and 3, this is accomplished by supporting the rear edge of the tray lid 88 on one or more support ledges 89 extending inwardly from the back wall 49 of the chamber 48. Alternatively, the tray lid 88 could be hinged to the back wall 49. Like the oven chamber 48, the tray lid 88 is made of a microwave transparent material such as ceramic. The tray lid 88 helps retain heat in the adsorbent 82 and acts to prevent the desorbed vapors from escaping through the top of the tray 24. However, the tray lid 88 and tray 24 do not form a perfect gas seal so that the purge gas which seeps into the oven chamber 48 can also pass through the tray-tray lid intersection to facilitate removal of gases through the outlet 84 and vent 68. The chamber door 52 is provided with a inwardly-extending lip 90 along its bottom edge. Thus, as shown in FIG. 3, raising the door 52 causes the door lip 90 to engage the tray lid 88, thereby pivoting the tray lid 88 upward and permitting the tray 24 to be removed from the oven chamber 48. The tray lid 88 is lowered when the door 52 is lowered again.

The tray 24 is also provided with two line connector rods 92,93 attached to opposing sides of the tray 24. The connector rods 92,93 connect the flexible line element 19 of the tray drive system to the tray 24. The connector rods 92,93 are of sufficient length so as to extend through the chamber 48 and out of the second enclosure 16 when the tray 24 is fully positioned in the chamber 48. Thus, only the connector rods 92,93, which are made of a microwave transparent material, and not the flexible line element 19, are disposed in the second enclosure 16 when microwaves are present. As seen in FIG. 2, the front connector rod 92 extends through the door 52, the insulation 55, and the metal layer 66. The door 52 is provided with a slot (not shown) extending upwardly from its lower edge to allow the door 52 to close over the front connector rod 92. The connector rods 92,93 are attached very low to the tray 24 so that this slot can be kept small. The back connector rod 93 extends through the back wall 49 of the chamber 48, the insulation 55, and the housing 12 of the second enclosure 16. A resilient grommet 94 is provided in the back wall 49 to facilitate movement of the back connector rod 93 therethrough.

Figure 4:
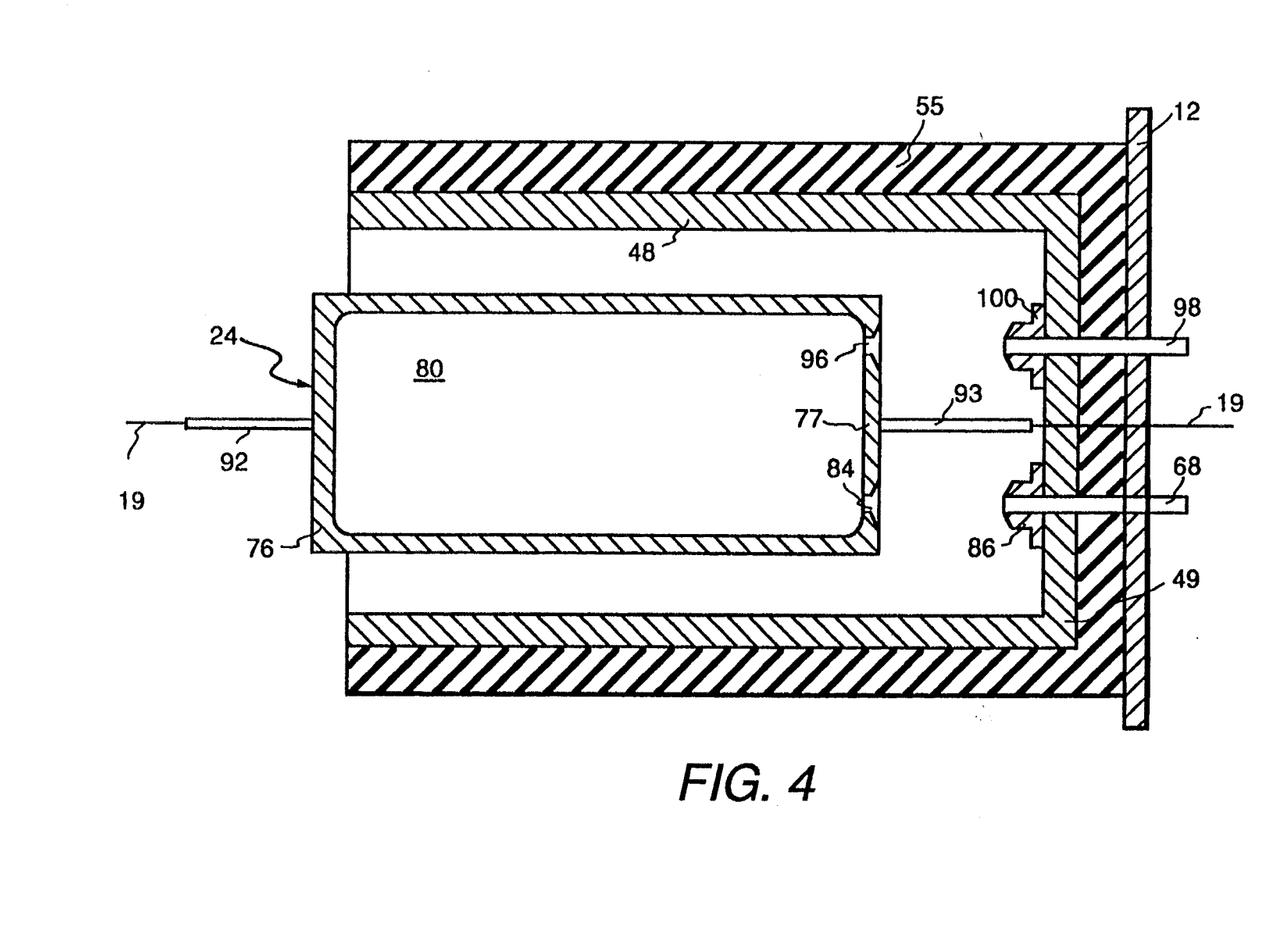
FIG. 4 shows a cross-section view of the oven chamber and tray taken along line 4—4 of FIG. 3.

A small portion of the adsorbent in the tray 24 may be reduced to small particles capable of sifting through the support plate 78 in to the plenum 80. Build up of this attrited adsorbent in the plenum 80 could reduce plenum volume and shield microwaves coming from under the tray 24. FIG. 4 shows an access port for removing the adsorbent build up from the plenum 80. The access port comprises a first aperture 96 formed in the back wall 77 of the tray housing 76 and a corresponding second aperture 98 formed in the back wall 49 of the oven chamber 48. The two apertures 96,98 are aligned with one another and are connected, when the tray 24 is fully positioned in the chamber 48, via a bayonet joint 100 coupled to the second aperture 98. The apertures 96,98 are positioned below the support plate 78 to provide access to the plenum 80 and to one side of the tray 24. The apertures 96,98 are positioned to one side because the attrited adsorbent will tend to build up on one side due to the rotary tray emptying procedure. Removal of the adsorbent can be accomplished by inserting an aspirating cleanout lance (not shown) through the apertures 96,98 and vacuuming the adsorbent. The top view FIG. 4 also shows that the internal corners of the tray housing 76 are rounded to minimize local overheating by the microwave energy.

Figure 5:
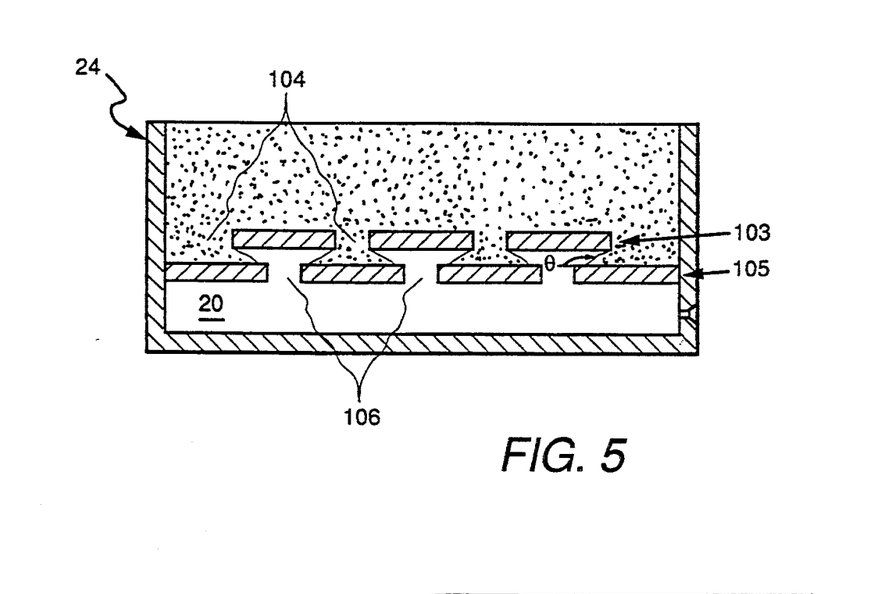
FIG. 5 shows a cross-sectional view of a second preferred embodiment of the adsorbent carrier tray of the present invention.

The present invention includes alternatives to the support plate 78 described above. These variations use a two-tiered support structure which relies on the angle of repose of the adsorbent material to assist in supporting the adsorbent above the exhaust plenum 80 while still allowing gas flow therethrough. As used herein, the angle of repose, also known as the angle of rest, of a granular material is defined as the slope at which the granular material will come to a rest and stand without sliding when poured in a pile. FIG. 5 shows the two-tiered support structure in which an upper support tier 103 with a plurality of relatively large openings 104 is positioned directly above a lower support tier 105, having a plurality of large openings 106. The openings 104, 106 of the respective tiers are not directly above one another but are instead staggered so that as adsorbent falls through the openings 104 of the upper support tier 103 and onto the lower support tier 105 the angle of repose, $\theta$, of the adsorbent material prevents the adsorbent from falling through the openings 106 of the lower support tier 105.

Figure 6:
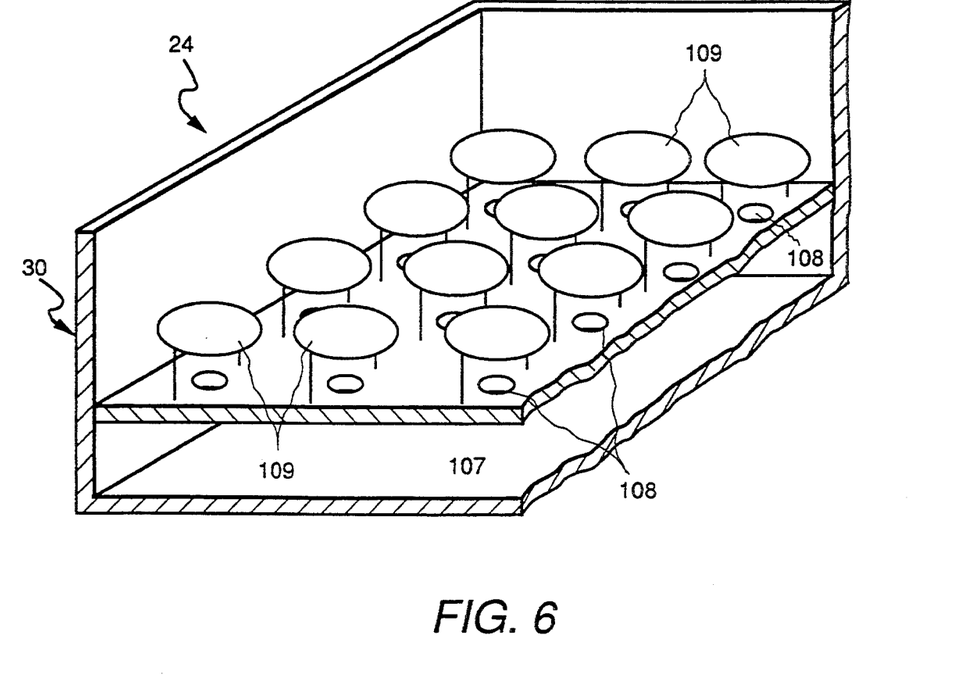
FIG. 6 shows a partial cut away perspective view of a first configuration of the FIG. 5 embodiment.

One configuration for a two-tiered support structure is shown in FIG. 6 wherein the lower support tier 105 is embodied by a support plate 107 having a plurality of large holes 108. The upper support tier 103 is embodied by a plurality of circular plates 109 supported above the support plate 107 and centered over the respective holes 108. The diameters of the circular plates 109 must be sufficiently greater than the diameters of the holes 108 so that the angle of repose would prevent adsorbent spilling over the edges of the circular plates 109 from falling through the holes 108. For instance, if the adsorbent material is activated carbon then holes 108 having approximately one inch diameters on three inch centers and circular plates 109 having diameters 2–3 times that of the holes 108 disposed about 0.5–1 hole diameters above the support plate 107 would be sufficient to support the carbon without fall-through. Conversely, the circular plates 109 could be supported below the support plate 107.

Figure 7:
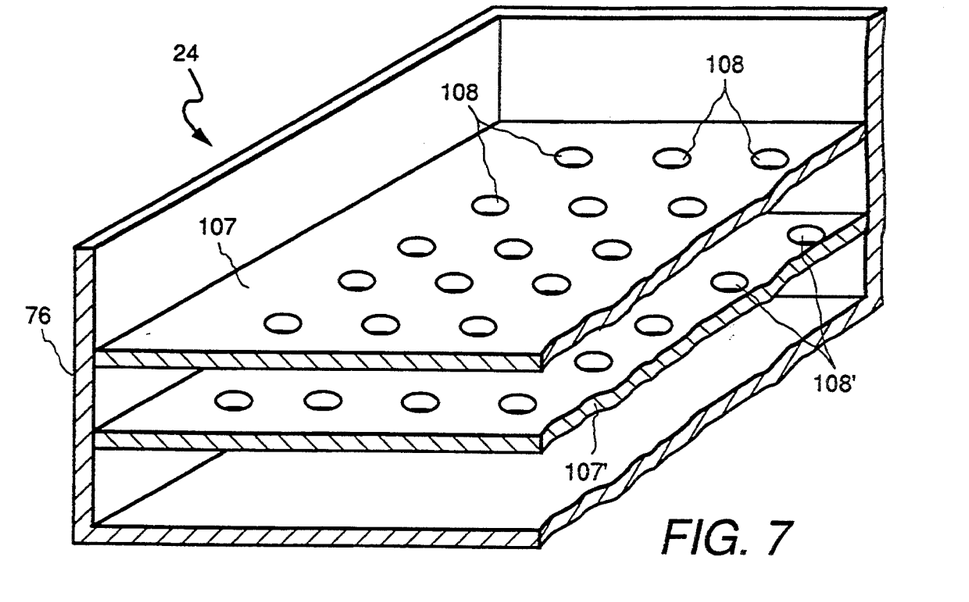
FIG. 7 shows a partial cut away perspective view of a second configuration of the FIG. 5 embodiment.

FIG. 7 shows a variation to the two-tiered support structure of FIG. 6. In this configuration the lower support tier 105 is again embodied by a support plate 107 having a plurality of large holes 108. However, the upper support tier 103 is embodied by a second support plate 107' having a plurality of large holes 108' disposed above the first plate 107 instead of circular plates. The holes 108,108' are arranged on the respective plates 107,107' so as not to be in vertical alignment and are spaced sufficiently so that the angle of repose would prevent adsorbent falling through the holes 108' of the upper plate 107' from falling through the holes 108 of the lower plate 107.

Figure 8:
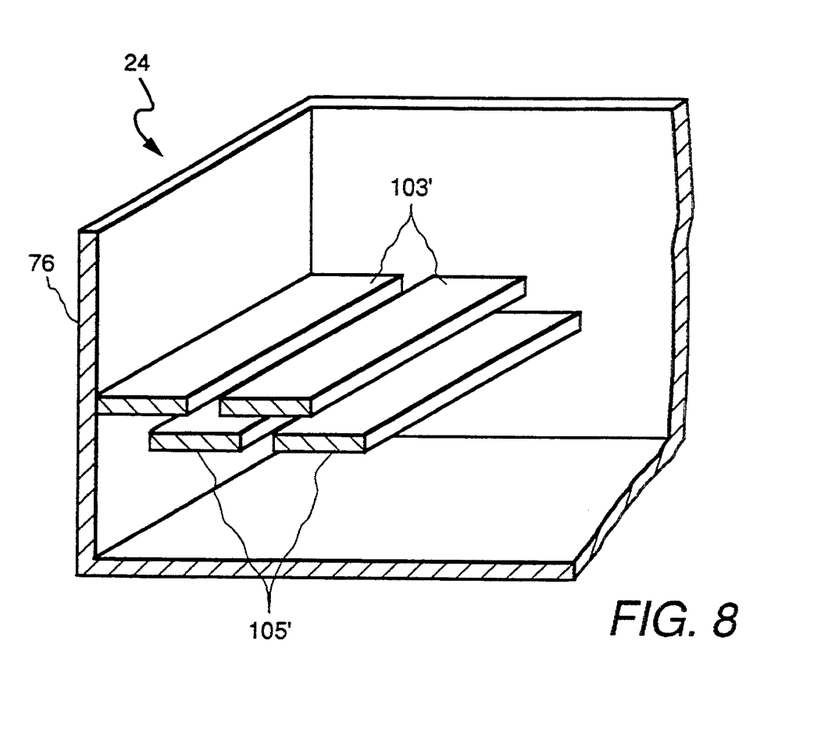
FIG. 8 shows a partial cut away perspective view of a third configuration of the FIG. 5 embodiment.

FIG. 8 shows a third configuration using the angle of repose concept. In this configuration, the upper support tier 103 is a first series of flat, wide bars or slats 103' spanning the width of the tray 24 with moderate gaps (about three particle diameters) between each bar 103'. The lower support tier 105 is a second series of similarly spaced flat, wide bars or slats 105' located under the gaps of the first series of bars 103'. The edges of the respective series of bars would be staggered to create a sufficient overlap so that the angle of repose of the material would prevent adsorbent from falling through the lower tier 105. The side edges of the lower bars 105' could be slightly upturned to assist in holding the adsorbent. When using the FIG. 8 embodiment with the rotary tray dump, any adsorbent fines that did happen to slip through the bars would fall back out during unloading as long as the tray was rotated in the plane of the bars. This could possibly eliminate the need for the cleanout lance discussed above.

In operation, the tray 24, initially empty, is positioned in the solids handling station 20 below the input hopper 36. The hopper valve 40 is opened to allow sorbated adsorbent to begin falling into the feed chute 38. At the same time, the tray 24 is pulled by the flexible line element 19 of the tray drive system toward the desorbing station 22 and engages the control arm 41, causing the chute door 39 to open and evenly load adsorbent in the tray 24. As the tray 24 completely passes under the chute 38, the control arm 41 is disengaged and the chute door 39 closes. Displacement of the tray 24 toward the oven chamber 48 is continued. Once the tray 24 is fully inside the chamber 48, the chamber door 52 is closed via the actuator 54 which lowers the tray lid 88 on top of the tray 24. The microwave power source 60 is started to heat the adsorbent on the tray 24, and the inlets 70,72 are opened to initiate purge gas flow. If needed for reactivation, reactants are introduced via the reactant inlet 73. The microwave heating causes the sorbates in the adsorbent to be released as vapors, and the vapors are removed through vent 68 by the gas processing unit 74. After the desorbing process is finished, the door 52 is raised which lifts the tray lid 88. The tray drive system is activated to pull the tray 24 out of the chamber 48 and through the passage 18 to the solids handling station 20. The tray 24 is displaced until it abuts against the detent flange of the second tray holding bracket 34 on the rotary tray supporting platform 28. The rotary motor 30 is activated to rotate the rotary tray supporting platform 28. The tray 24 is inverted by the rotation of the platform 28, thereby emptying the treated adsorbent. Then the rotary tray supporting platform 28 is rotated back to return the tray 24 to an upright position. The empty, upright tray 24 is now positioned below the input hopper 36 so that the process can be repeated.

In one example using activated carbon as the adsorbent, 100 pound loads of carbon were desorbed in each batch. The cycle time using a 60 kW microwave power source for each batch was approximately 30 minutes, thereby producing a throughput of about 200 pounds per hour. The cycle time included approximately one minute for loading the tray 24 and moving it into the oven chamber 48, one minute for removing and emptying the tray 24, and the remaining time for heating and desorbing the carbon. The tray 24 holds a significant amount of heat due to conduction from the heated adsorbent. But since the time the tray 24 is out of the oven chamber 48 between batches is minimal (about two minutes), the tray 24 has little time to cool and retains most of its heat. Thus, the tray does not need to be reheated during each batch. This is increases energy efficiency and reduces overall cycle time.

Figure 9A:
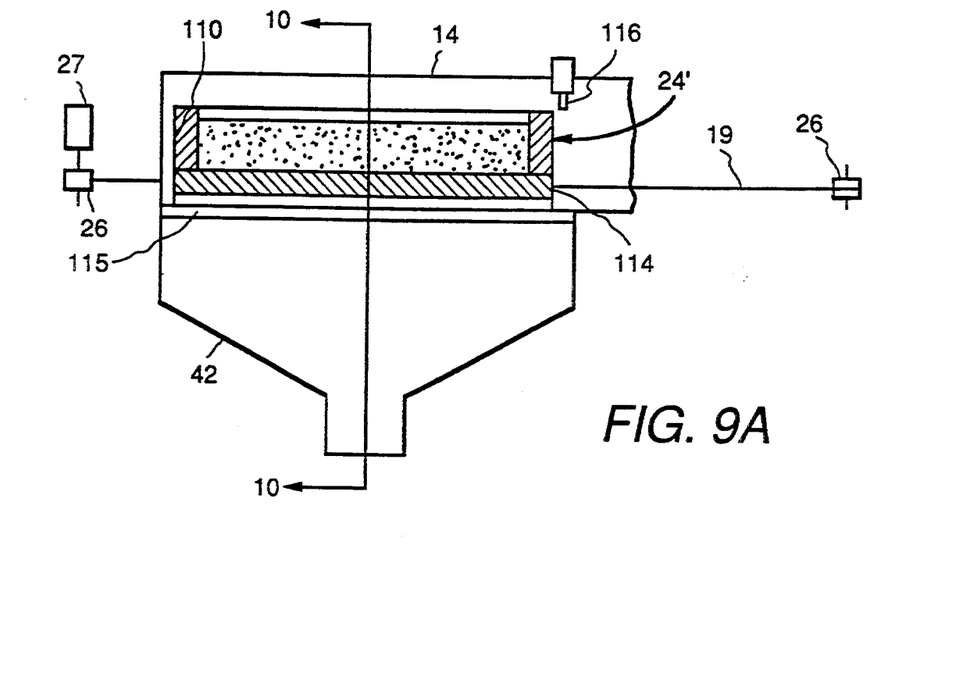
FIGS. 9A and 9B show elevation views of a second embodiment of the tray emptying means of the present invention.
Figure 9B:
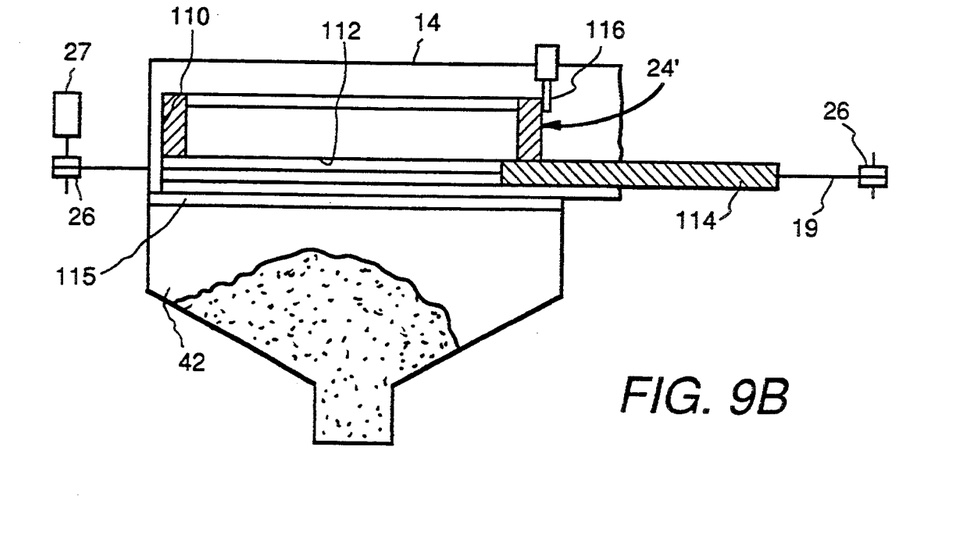
Figure 10:
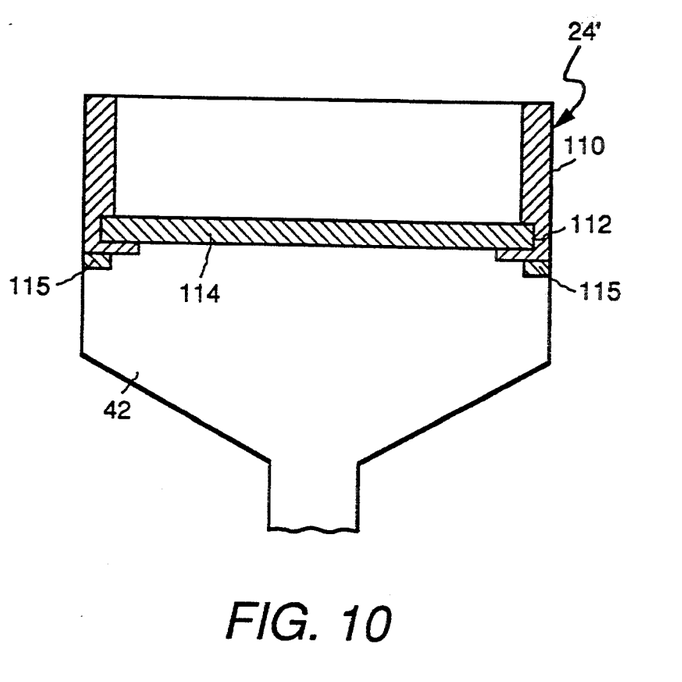
FIG. 10 shows a cross-sectional view of the second tray emptying embodiment taken along line 10—10 of FIG. 9A.

Alternatives to the rotary platform 28 as a means for emptying the tray 24 can be employed with the present invention. FIGS. 9A, 9B and 10 show one such alternative tray emptying arrangement wherein a specially adapted tray 24' is provided. As seen in FIGS. 9A, 9B and 10, the tray 24' is a two piece unit. FIG. 9A shows the two pieces together, and FIG. 9B shows them separated. FIG. 10 shows a cross-sectional view taken along line 10—10 of FIG. 9A. The first piece is a tray housing 110 which is in the form of a rectangular annulus, that is, a member having four walls with an open top and bottom. The housing 110 has a groove 112 formed along the inner surface of each of the two long walls near the bottom thereof. The second piece of the two piece unit is a bottom panel 114 which slideably fits in the grooves 112 of the housing 110 to provide a bottom to the tray 24'. The tray 24' is supported in the solids handling station 20 by a pair of spaced rails 115. The rails 115 are located above or at the top of the output hopper 42, on opposite sides thereof so that when supported on the rails 115, the tray 24' is positioned over the opening of the output hopper 42 and below the input hopper 36.

The ends of the flexible line element 19 of the tray drive system are attached to respective ends of the bottom panel 114. The fit between the bottom panel 114 and the grooves 112 of the tray housing 110 is snug enough that a pulling force exerted on the bottom panel 114 by the flexible line element 19 will displace the bottom panel 114 and the housing 110 together. However, if movement of the housing 110 is restrained, then the force of the flexible line element 19 pulling on the bottom panel 114 will be sufficient to cause the panel 114 to slide away from the housing 110 producing an open bottom. The tray housing 110 is restrained by a retractable detent arm 116. The detent arm 116 is displaceable between two positions: a first position, shown in FIG. 9A, where the arm 116 is not in contact with the tray housing 110 and a second position, shown in FIG. 9B, where the arm 116 is in contact with the tray housing 110. The detent arm 116 is positioned above the tray 24' near the passage 18 so that when the arm 116 does contact the tray housing 110, it contacts the housing 110 on its outer surface nearest the passage 18. Thus, the detent arm will prevent the housing 110 from moving toward the passage 18. The detent arm 116 can be displaced by any means known in the art such as an electric or hydraulic actuator.

Thus, in operation, the detent arm 116 is in its retracted position while the tray 24' is located in the desorbing station 22 (not shown in FIGS. 9A, 9B and 10). When the desorbing process is completed, the tray 24' carrying treated adsorbent is removed from the desorbing station 22 and positioned on the rails 115 in the solids handling station 20 (FIG. 9A). The detent arm 116 is then actuated to engage the outer surface of the tray housing 110. Then the flexible line element 19 is activated to move back toward the desorbing station 22, causing the bottom panel 114.to slide away from the housing 110 which is held in place by the detent arm 116. This causes the adsorbent to fall out of the tray 24, between the rails 115, and into the output hopper 42. The panel 114 is moved until it reaches the edge of the housing 110 and the two pieces are almost Completely separated (FIG. 9B). At this point, the tray 24' is empty, and the direction of the flexible line element movement is reversed to return the bottom panel 114 in position in the tray housing 110. The detent arm 116 is retracted. The empty tray 24' is now intact again and ready to be loaded for the next batch.

Figure 11A:
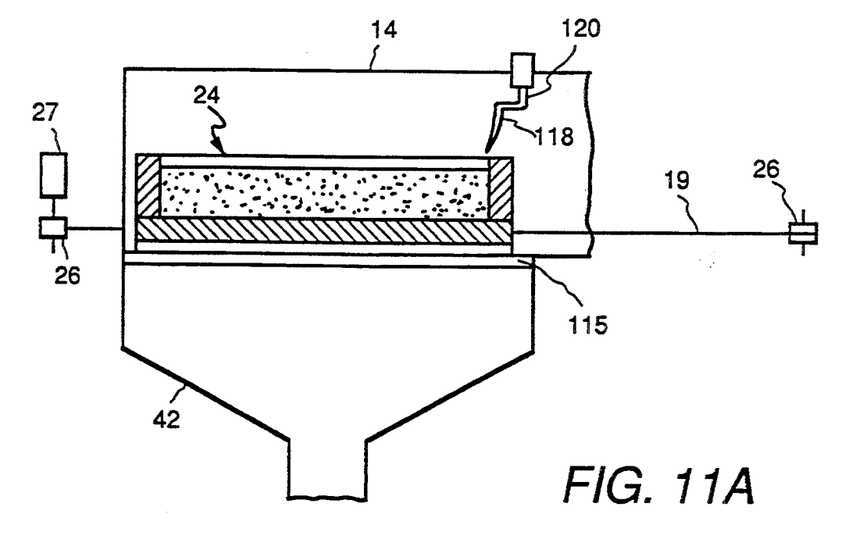
FIGS. 11A and 11B show elevation views of a third embodiment of the tray emptying means of the present invention.
Figure 11B:
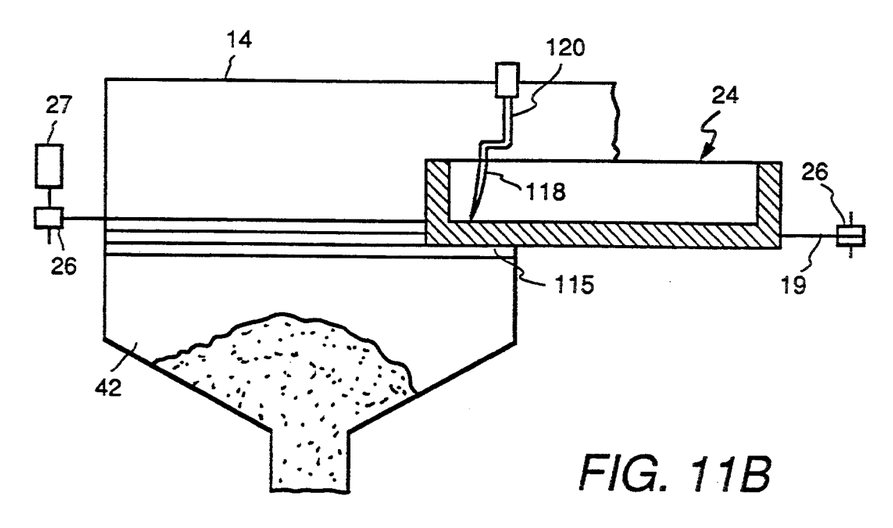

A second alternative tray emptying arrangement is shown in FIGS. 11A and 11B. With this arrangement the normal, one-piece tray 24 is used and supported in the solids handling station 20 by the spaced apart rails 115. This arrangement includes a plow member 118 mounted on a retractable support arm 120. The support arm 120 is displaceable between two positions: a first position, shown in FIG. 11A, where the arm 120 is retracted so that the plow member is not disposed within the tray 24 and a second position, shown in FIG. 11B, where the arm 120 is extended so that the plow member 118 is disposed within the tray 24. The support arm 120 is positioned above the tray 24 near the passage 18 so that when the arm 120 is extended, the plow member 118 is disposed in the tray 24 close to the end of the tray 24 nearest to the passage 18. The support arm 120 and the plow member 118 can be displaced by any means known in the art such as an electric or hydraulic actuator.

In operation, the support arm 120 is in its retracted position while the tray 24 is located in the desorbing station 22 (not shown in FIGS. 11A and 11B). When the desorbing process is completed, the tray 24 carrying treated adsorbent is removed from the desorbing station 22 and onto the rails 115 in the solids handling station 20 (FIG. 11A). When the tray 24 is positioned fully in the solids handling station 20, the support arm 120 is actuated to position the plow member 118 into the tray 24. Then the flexible line element 19 is activated to move the tray 24 back toward the desorbing station 22. As the tray 24 is moved toward the desorbing station 22, the plow member 118, which is stationary, forces the adsorbent out of the tray 24. The displaced adsorbent falls between the two rails 115 into the output hopper 42. The tray 24 is displaced until the plow member 118 reaches the other side of the tray 24 (FIG. 11B). At this point, the adsorbent emptying process is completed, and the plow member 118 is retracted while direction of the flexible line element movement is reversed so as to return the empty tray 24 to loading position in the solids handling station 20. The tray 24 is now ready to-be loaded again for the next batch.

Both of these alternate tray emptying arrangements could be used with the ventilated tray embodiment described above. Furthermore, with both alternative arrangements, a thin layer of adsorbent could be left along the bottom of the tray. In the two-piece arrangement, a slight clearance between the bottom panel 114 and the back wall of the housing 110 would leave the thin layer. In the plow arrangement, the support arm 120 would be designed to position the plow member slightly above the support of the adsorbent bed when the plow member is insert in the tray 24. The thin layer of adsorbent, ideally about 0.1–0.5 inches, will still be warm and thus insulates the tray 24 from the thermal shock resulting from the cool adsorbent being loaded from the input hopper 36 for the next batch.

The foregoing has described an on-site batch system for microwave desorption of adsorbents which includes means for handling the adsorbent efficiently and with minimal attrition losses. The system is applicable to the reactivation or regeneration of a wide range of adsorbent materials. The system also conserves heat between batches to operate in an energy efficient manner and reduce cycle time.

While specific embodiments of the present invention have been described, it will be apparent to those skilled in the art that various modifications thereto can be made without departing from the spirit and scope of the invention as defined in the appended claims.

What is claimed is:

1. An apparatus for desorbing a sorbated adsorbent, said apparatus comprising:
   a microwave desorbing station;
   an adsorbent handling station positioned adjacent to said desorbing station;
   an adsorbent carrier tray arranged so as to be displaceable between said adsorbent handling station and said desorbing station; and
   means for displacing said adsorbent carrier tray between said adsorbent handling station and said desorbing station.

2. The apparatus of claim 1 wherein said desorbing station comprises a microwave heating unit comprising an adsorbent heating chamber, and means for removing desorbed materials from said adsorbent heating chamber.

3. The apparatus of claim 2 wherein said adsorbent heating chamber has a door for admitting said adsorbent carrier tray.

4. The apparatus of claim 3 further comprising a tray lid hinged to an inner wall of said adsorbent heating chamber, said tray lid being arranged to rest on said adsorbent carrier tray when said adsorbent carrier tray is positioned in said adsorbent heating chamber and said door is closed.

5. The apparatus of claim 4 further comprising a lip extending from said door positioned to engage said tray lid as said door is opened.

6. The apparatus of claim 2 wherein said means for removing desorbed materials comprises a vent in said adsorbent heating chamber.

7. The apparatus of claim 2 further comprising a plurality of rollers disposed in said adsorbent heating chamber.

8. The apparatus of claim 2 further comprising means for introducing a purge gas into said adsorbent heating chamber.

9. The apparatus of claim 2 further comprising means for introducing a reactivation reactant into said adsorbent heating chamber.

10. The apparatus of claim 1 wherein said adsorbent handling station comprises a tray supporting structure, a first receptacle located above said tray supporting structure, and a second receptacle located below said tray supporting structure.

11. The apparatus of claim 10 wherein said tray supporting structure comprises a rotatable platform, said apparatus further comprising means to rotate said rotatable platform.

12. The apparatus of claim 11 further comprising tray holding brackets attached to said rotatable platform.

13. The apparatus of claim 10 wherein said tray supporting structure comprises a pair of spaced-apart rails.

14. The apparatus of claim 13 further comprising a retractable plow member positioned above said tray supporting structure, said plow member being positioned so as to be displaceable into said adsorbent carrier tray when said adsorbent carrier tray is positioned on said tray supporting structure.

15. The apparatus of claim 13 wherein said adsorbent carrier tray comprises an annulus section and a panel section slideably fitted in said annulus section, and further comprising a retractable detent member positioned above said tray supporting structure, said detent member being positioned so as to be displaceable in and out of engagement with said annulus section when said adsorbent carrier tray is positioned on said tray supporting structure.

16. The apparatus of claim 1 wherein said adsorbent carrier tray comprises:
   a housing having four walls and a bottom piece;
   a gas-permeable adsorbent support structure disposed in said housing and spaced above said bottom piece; and
   an exhaust gas outlet located in one of said four walls.

17. The apparatus of claim 16 wherein said adsorbent support structure comprises a porous plate.

18. The apparatus of claim 16 wherein said adsorbent support structure comprises a plate having a plurality of holes formed therein and a plurality of circular members having larger diameters than said holes, each of said plurality of circular members being centered above one of said plurality of holes.

19. The apparatus of claim 16 wherein said adsorbent support structure comprises a first plate having a plurality of holes formed therein and a second plate having a plurality of holes formed therein disposed above said first plate, each of said plurality of holes on said first plate being arranged so as not to be in vertical alignment with each of said plurality of holes on said second plate.

20. The apparatus of claim 16 wherein said adsorbent support structure comprises a first plurality of spaced, coplanar bars defining gaps therebetween and a second plurality of spaced, coplanar bars disposed below said first plurality, each one of said second plurality of bars being located below one of said gaps defined by said first plurality of bars.

21. The apparatus of claim 16 further comprising an access aperture located in one of said four walls.

22. The apparatus of claim 21 wherein said exhaust gas outlet and said access aperture are located in the same one of said four walls.

23. The apparatus of claim 1 wherein said means for displacing said adsorbent carrier tray comprises a flexible line element attached to opposing ends of said adsorbent carrier tray and a motor for driving said flexible line element.

24. The apparatus of claim 23 wherein said flexible line element is attached to said adsorbent carrier tray by means of microwave transparent connector rods.

25. An apparatus for desorbing a sorbated adsorbent, said apparatus comprising:
- a housing including a first enclosure and a second enclosure and a passage connecting said first and second enclosures;
- an adsorbent carrier tray arranged to be displaceable between said first and second enclosures via said passage;
- a tray supporting structure disposed in said first enclosure;
- an adsorbent heating chamber disposed in said second enclosure, said adsorbent heating chamber having a door for admitting said adsorbent carrier tray;
- means for displacing said adsorbent carrier tray between said tray supporting structure and said oven chamber; and
- a source of microwave power positioned to generate microwaves in said second enclosure.

26. The apparatus of claim 25 further comprising a tray lid hinged to an inner wall of said adsorbent heating chamber, said tray lid being arranged to rest on said adsorbent carrier tray when said adsorbent carrier tray is positioned in said adsorbent heating chamber and said door is closed.

27. The apparatus of claim 26 further comprising a lip extending from said door positioned to engage said tray lid as said door is opened.

28. The apparatus of claim 25 further comprising a vent in said adsorbent heating chamber.

29. The apparatus of claim 25 further comprising a plurality of rollers disposed in said adsorbent heating chamber.

30. The apparatus of claim 25 further comprising means for introducing a purge gas into said adsorbent heating chamber.

31. The apparatus of claim 25 further comprising means for introducing a reactivation reactant into said adsorbent heating chamber.

32. The apparatus of claim 25 further comprising a first receptacle located above said tray supporting structure and a second receptacle located below said tray supporting structure.

33. The apparatus of claim 32 wherein said tray supporting structure comprises a rotatable platform, said apparatus further comprising means to rotate said rotatable platform.

34. The apparatus of claim 33 further comprising tray holding brackets attached to said rotatable platform.

35. The apparatus of claim 32 wherein said tray supporting structure comprises a pair of spaced-apart rails.

36. The apparatus of claim 35 further comprising a retractable plow member positioned above said tray supporting structure, said plow member being positioned so as to be displaceable into said adsorbent carrier tray when said adsorbent carrier tray is positioned on said tray supporting structure.

37. The apparatus of claim 35 wherein said adsorbent carrier tray comprises an annulus section and a panel section slideably fitted in said annulus section, and further comprising a retractable detent member positioned above said tray supporting structure, said detent member being positioned so as to be displaceable in and out of engagement with said annulus section when said adsorbent carrier tray is positioned on said tray supporting structure.

38. The apparatus of claim 25 wherein said adsorbent carrier tray comprises:
- a housing having four walls and a bottom piece;
- a gas-permeable adsorbent support structure disposed in said housing and spaced above said bottom piece; and
- an exhaust gas outlet located in one of said four walls.

39. The apparatus of claim 38 wherein said adsorbent support structure comprises a porous plate.

40. The apparatus of claim 38 wherein said adsorbent support structure comprises a plate having a plurality of holes formed therein and a plurality of circular members having larger diameters than said holes, each of said plurality of circular members being centered above one of said plurality of holes.

41. The apparatus of claim 38 wherein said adsorbent support structure comprises a first plate having a plurality of holes formed therein and a second plate having a plurality of holes formed therein disposed above said first plate, each of said plurality of holes on said first plate being arranged so as not to be in vertical alignment with each of said plurality of holes on said second plate.

42. The apparatus of claim 38 wherein said adsorbent support structure comprises a first plurality of spaced, coplanar bars defining gaps therebetween and a second plurality of spaced, coplanar bars disposed below said first plurality, each one of said second plurality of bars being located below one of said gaps defined by said first plurality of bars.

43. The apparatus of claim 38 further comprising an access aperture located in one of said four walls.

44. The apparatus of claim 43 wherein said exhaust gas outlet and said access aperture are located in the same one of said four walls.

45. The apparatus of claim 25 wherein said means for displacing said adsorbent carrier tray comprises a flexible line element attached to opposing ends of said adsorbent carrier tray and a motor for driving said flexible line element.

46. The apparatus of claim 45 wherein said flexible line element is attached to said adsorbent carrier tray by means of microwave transparent connector rods.

* * * * *